(12) United States Patent
Ulrich et al.

(10) Patent No.: US 7,255,271 B2
(45) Date of Patent: Aug. 14, 2007

(54) CHECK-OUT COUNTER SYSTEMS AND METHODS

(75) Inventors: Curtis J. Ulrich, Eagan, MN (US); Robert W. Ash, Andover, MN (US); Blake M. Johnson, St. Paul, MN (US); William D. Splain, Brooklyn Park, MN (US); Mitchell W. Knoll, Eagan, MN (US)

(73) Assignee: Target Brands, Inc., Minneapolis, MN (US)

( * ) Notice: Subject to any disclaimer, the term of this patent is extended or adjusted under 35 U.S.C. 154(b) by 372 days.

(21) Appl. No.: 10/961,259

(22) Filed: Oct. 8, 2004

(65) Prior Publication Data

US 2006/0076406 A1 Apr. 13, 2006

(51) Int. Cl.
*G06K 15/00* (2006.01)
(52) U.S. Cl. .................. 235/383; 186/59; 186/66
(58) Field of Classification Search ............ 235/383, 235/385, 380, 375; 186/66, 61, 64, 59
See application file for complete search history.

(56) References Cited

U.S. PATENT DOCUMENTS

| | | |
|---|---|---|
| 1,580,163 A | 4/1926 | Peterson et al. |
| 2,324,596 A | 7/1943 | Quain |
| 2,871,984 A | 2/1959 | Colman |
| 2,978,069 A | 4/1961 | Shoffner |
| 3,075,616 A | 1/1963 | Shoffner |
| 3,126,981 A | 3/1964 | Crawford |
| 3,348,760 A | 10/1967 | Hinsken et al. |
| 3,774,838 A | 11/1973 | Christie |
| 4,165,832 A | 8/1979 | Kuklies et al. |
| 4,316,353 A | 2/1982 | Suominen |
| 4,398,689 A | 8/1983 | Prader |
| 4,476,979 A | 10/1984 | Reimann et al. |
| 4,480,750 A | 11/1984 | Dancy |
| 4,493,419 A | 1/1985 | Prader et al. |
| 4,529,090 A | 7/1985 | Pilon |
| 4,554,192 A | 11/1985 | Benoit |
| 4,560,067 A | 12/1985 | Reimann |
| 4,562,925 A | 1/1986 | Pistner |
| 4,592,938 A | 6/1986 | Benoit |
| 4,597,749 A | 7/1986 | O'Brien et al. |
| 4,604,084 A | 8/1986 | Pistner |
| 4,699,608 A | 10/1987 | Pistner |
| 4,720,872 A | 1/1988 | Kaczerwaski |
| 4,744,200 A | 5/1988 | Benoit, Jr. et al. |

(Continued)

*Primary Examiner*—Thien M. Le
*Assistant Examiner*—Edwyn Labaze
(74) *Attorney, Agent, or Firm*—Ingrassia Fisher & Lorenz, P.C.

(57) ABSTRACT

A bagging station within a check-out counter system and for use by a cashier positioned in a cashier location within the check-out counter system. The bagging station includes a lower bag rack and an upper bag rack. The lower bag rack is configured to hold at least one bag for loading with a first portion of merchandise and defines a first upper edge. The upper bag rack is configured to hold at least one bag for loading with a second portion of merchandise. The upper bag rack is positioned behind the lower bag rack relative to the cashier location, and the upper bag rack defines a second upper edge. The first upper edge and the second upper edge are arranged in a terraced configuration. Check-out counter systems and methods of processing merchandise provide additional advantages.

26 Claims, 8 Drawing Sheets

U.S. PATENT DOCUMENTS

| | | | |
|---|---|---|---|
| 4,785,938 A | 11/1988 | Benoit, Jr. et al. |
| 4,796,759 A | 1/1989 | Schisler |
| 4,807,754 A | 2/1989 | Rowe |
| 4,811,417 A | 3/1989 | Prince et al. |
| 4,819,806 A | 4/1989 | Pistner |
| 4,821,985 A | 4/1989 | DeMatteis et al. |
| 4,877,473 A | 10/1989 | Snowdon et al. |
| 4,883,450 A | 11/1989 | Benoit |
| 4,909,636 A | 3/1990 | DeMatteis et al. |
| 4,911,560 A | 3/1990 | Hoover et al. |
| 4,923,436 A | 5/1990 | Gelbard |
| 4,925,438 A | 5/1990 | Wagner |
| RE33,264 E | 7/1990 | Baxley et al. |
| 4,953,664 A | 9/1990 | Vrooman et al. |
| 4,981,216 A | 1/1991 | Wilfong, Jr. |
| 4,989,732 A | 2/1991 | Smith |
| 4,995,860 A | 2/1991 | Wilfong, Jr. |
| 5,011,466 A | 4/1991 | DeMatteis et al. |
| 5,013,290 A | 5/1991 | DeMatteis |
| 5,020,750 A | 6/1991 | Vrooman et al. |
| 5,074,674 A | 12/1991 | Kuklies et al. |
| 5,087,234 A | 2/1992 | Prader et al. |
| 5,115,888 A * | 5/1992 | Schneider ..................... 186/61 |
| 5,125,604 A | 6/1992 | Vrooman et al. |
| 5,131,499 A | 7/1992 | Hoar |
| RE34,019 E | 8/1992 | Kuklies et al. |
| 5,183,158 A | 2/1993 | Boyd et al. |
| 5,188,235 A | 2/1993 | Pierce et al. |
| 5,207,328 A | 5/1993 | Bose et al. |
| 5,211,263 A | 5/1993 | Davidson et al. |
| 5,269,605 A | 12/1993 | Nguyen |
| 5,323,909 A | 6/1994 | Piraneo et al. |
| 5,335,788 A | 8/1994 | Beasley et al. |
| 5,346,310 A | 9/1994 | Nguyen |
| 5,363,965 A | 11/1994 | Nguyen |
| 5,469,970 A | 11/1995 | Li |
| 5,561,967 A | 10/1996 | Nguyen |
| 5,562,580 A | 10/1996 | Beasley et al. |
| 5,573,489 A | 11/1996 | Letendre et al. |
| 5,626,550 A | 5/1997 | Amero et al. |
| 5,690,229 A | 11/1997 | Piraneo et al. |
| 5,816,027 A | 10/1998 | Li |
| 5,863,130 A | 1/1999 | Nguyen |
| 5,885,002 A | 3/1999 | Reiss |
| 5,992,570 A | 11/1999 | Walter et al. |
| 6,105,780 A | 8/2000 | Nguyen |
| 6,363,355 B1 * | 3/2002 | Morrison et al. ............. 705/23 |
| 6,491,218 B2 | 12/2002 | Nguyen |
| 6,550,583 B1 * | 4/2003 | Brenhouse ................... 186/66 |
| 6,857,505 B1 * | 2/2005 | Mason et al. ................. 186/59 |
| 7,044,370 B2 * | 5/2006 | Bellis et al. ................. 235/383 |
| 2004/0041021 A1 * | 3/2004 | Nugent ....................... 235/383 |

* cited by examiner

CHECK-OUT COUNTER SYSTEMS AND METHODS

BACKGROUND OF THE INVENTION

Within the supermarket and merchandising industries, many different styles of check-out counter systems are in use. With increasing labor costs and improved data systems, the pressure for productivity at the check-out location of these industries has increased dramatically. Little attention, however, has been given to the cashiers, leading to increased health complaints, worker compensation claims, and disability lawsuits. The major source of such claims is due to over exertion leading to strains and sprains of the lower back and upper extremities. Some of these injuries are permanently disabling.

It is only in recent years that certain of these injuries have been identified as work related. Biomechanical studies indicate that the lower back is vulnerable to stress damage during even moderate load handling, but that the symptoms may not manifest until later in the injured worker's life. Carpal tunnel syndrome and related injuries such as tendinitis, tenosynovitis and De Quervain's Disease are apparently caused by injuries that build up gradually over time before symptoms begin to appear. Tasks which are highly repetitive in nature dramatically increase the risk of injury. Fatigue also appears to be one of the underlying causes of many of the symptoms experienced by cashiers at check-out counter systems.

SUMMARY OF THE INVENTION

One aspect of embodiments of the present invention relates to a bagging station within a check-out counter system and for use by a cashier positioned in a cashier location within the check-out counter system. The bagging station includes a lower bag rack and an upper bag rack. The lower bag rack is configured to hold at least one bag for loading with a first portion of merchandise and defines a first upper edge. The upper bag rack is configured to hold at least one bag for loading with a second portion of merchandise. The upper bag rack is positioned behind the lower bag rack relative to the cashier location, and the upper bag rack defines a second upper edge. The first upper edge and the second upper edge are arranged in a terraced configuration. Other features and advantages are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
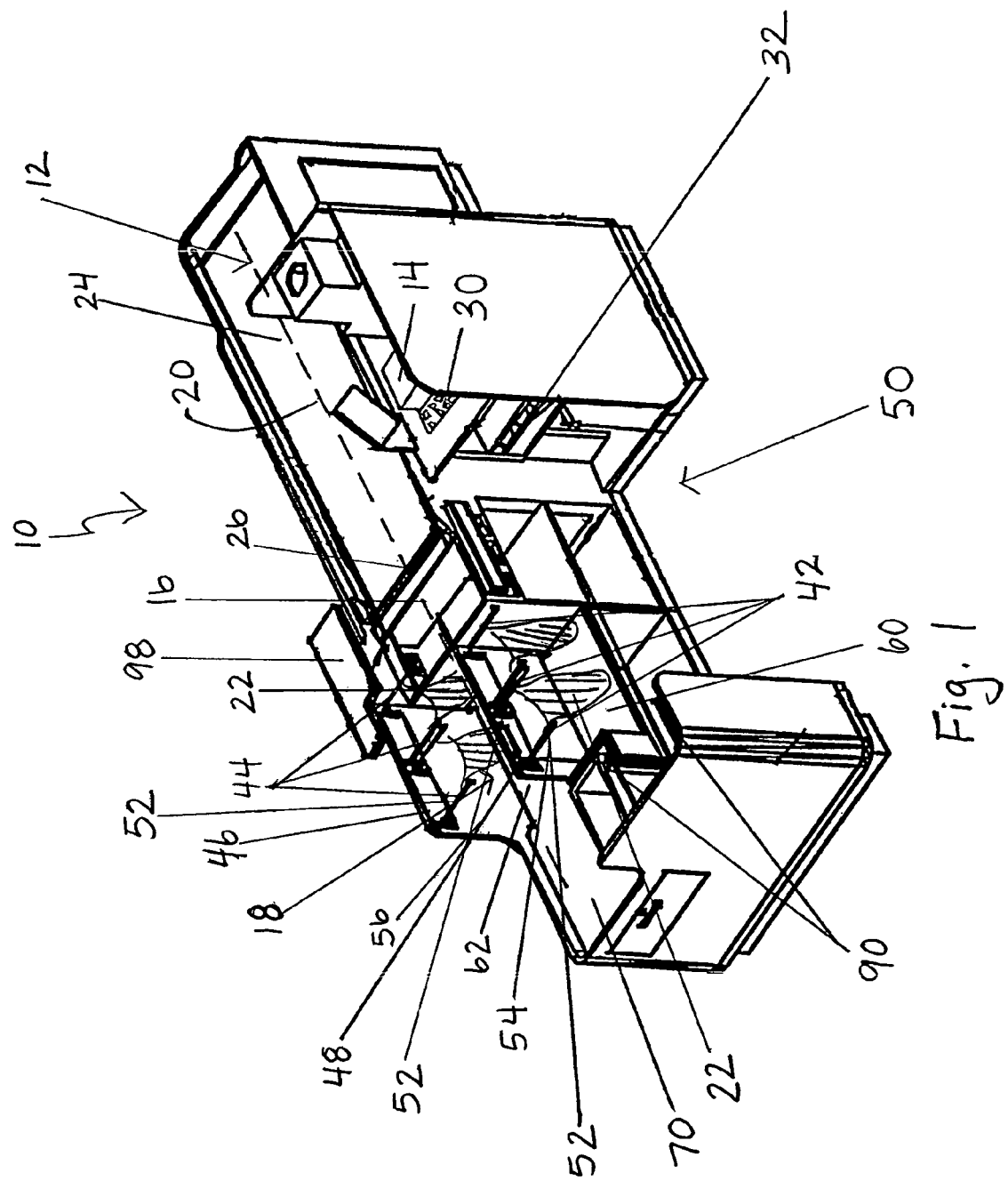
FIG. 1 is a rear isometric view of one embodiment of a check-out counter system, according to the present invention.
Figure 2:
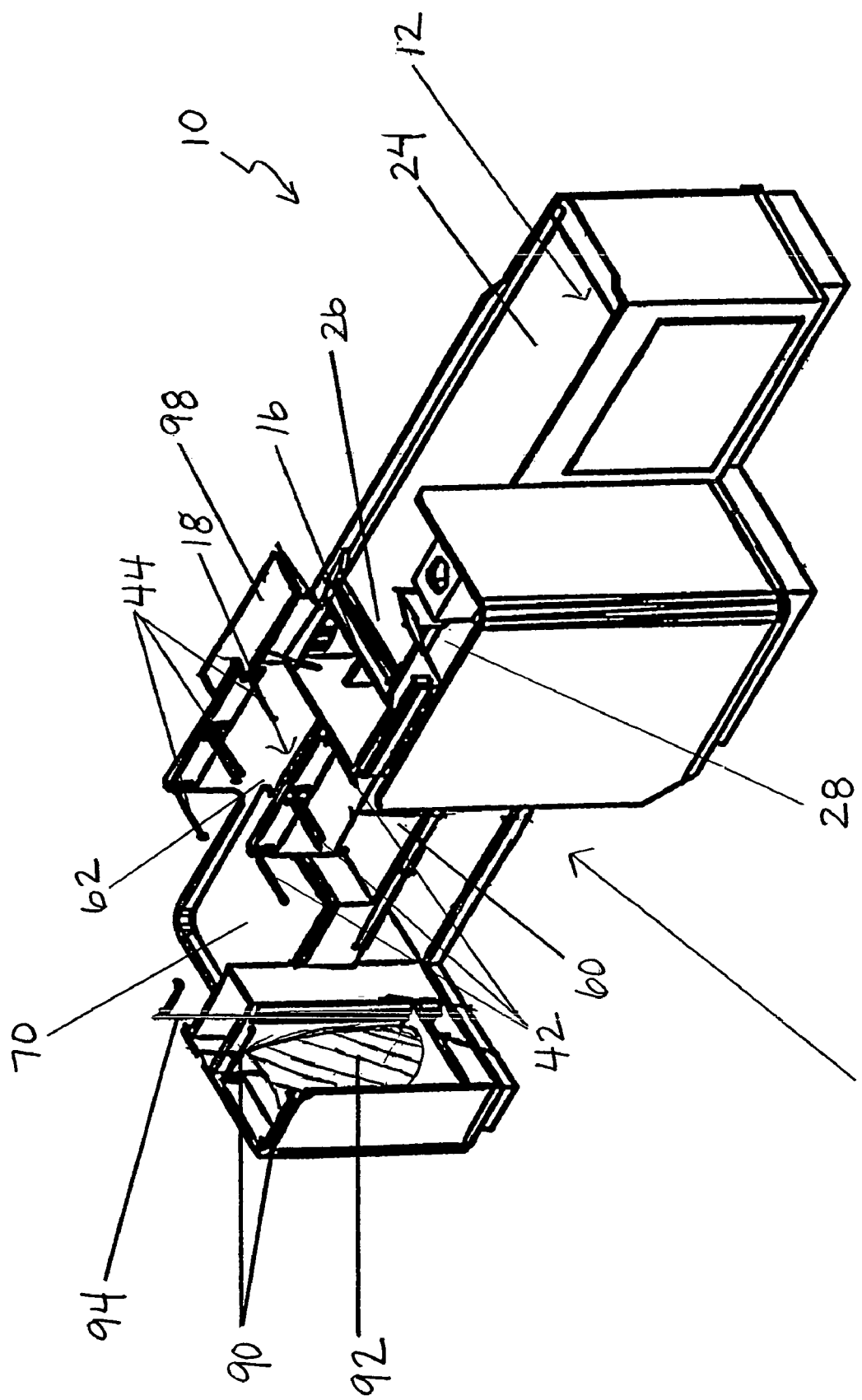
FIG. 2 is a front isometric view of the check-out counter system of FIG. 1.

FIGS. 1-5 illustrate a check-out counter system 10 for the supermarket and merchandising industries in accordance with one embodiment of the present invention. Although the check-out system 10 of this embodiment is optimized for the supermarket and merchandising industry, it can be adapted for a variety of other retail, wholesale, and/or warehouse applications. In one embodiment, the check-out counter system 10 includes an unload area 12, a point-of-sale terminal 14, a user interface 16, a bagging station 18.

Generally, merchandise is placed in the unload area 12 and advanced along a generally linear merchandise processing path, which is generally illustrated in FIG. 1 at 20. More particularly, merchandise placed in the unload area 12 is forwarded along the processing path 20 to the point-of-sale terminal 14 and the user interface 16 where it is processed before placement into one of a plurality of bags 22 stored at the bagging station 18. In this manner, the check-out counter system 10 is arranged in an intuitive manner based upon the merchandise processing path 20.

In the illustrated embodiment, the unload area 12 is the upper surface of a conveyor belt 24. The conveyor belt 24 includes a terminal end 26 located adjacent to the user interface 16. Merchandise placed on the unload area 12 of the conveyor belt 24 by a customer is conveyed to the terminal end 26 of the conveyor belt 24. In an alternate embodiment, the unload area 12 is a static surface along which merchandise is manually advanced. In another embodiment, the unload area 12 is relatively short such that a shopping cart containing merchandise can be positioned relatively near the user interface 16.

User interface 16 is configured to scan or otherwise processes items of merchandise for sale. In one embodiment, the user interface 16 is an optical or a radio frequency scanner or reader configured to read information from the merchandise moved into the near proximity of the scanner. For example, the scanner reads merchandise identification information and/or merchandise price information from a bar code or radio frequency identification (RFID) badge secured to the merchandise. Accordingly, a merchandise "scanner" or "reader" as used in the specification and claims includes the ability to access information from either bar codes or RFID badge. In one embodiment, the user interface 16 is electronically coupled with the point-of-sale terminal 14. The point-of-sale terminal 14 is typically located on a stand 28, which also preferably includes a data input device 30, such as a keyboard and a cash drawer 32. With this in mind, merchandise information can be recorded by the point-of-sale terminal 14 at least semi-automatically via user interface 16 or manually via the data input device 30.

The bagging station 18 is provided where the cashier loads merchandise into shopping bags 22. The bagging station 18 is preferably adjacent to a downstream edge 40 of the user interface 16. In one embodiment, bagging station 18 includes one or more lower bag racks 42 and one or more upper bag racks 44 each configured to support a plurality of bags 22 for subsequent loading with merchandise. Although the check-out counter system 10 is described herein as including two lower bag racks 42 and two upper bag racks 44, the number of bag racks and their relative positioning varies in different embodiments.

Each of the bags 22 on the bag racks 42 and 44 is accessible by the cashier. With this in mind, in one embodiment, the lower bag racks 42 are arranged in a terraced relationship with respect to the upper bag racks 44, so that an upper edge 46 of each of the upper bag racks 44 is positioned above an upper edge 48 of each the lower bag racks 42. In addition, the upper bag racks 44 are positioned behind the lower bag racks 42 relative to a cashier location 50. In one embodiment, the upper bag racks 44 are laterally positioned within reach of the customer, thereby allowing the customer to assist the cashier in loading merchandise into the bags 22, if the customer so desires.

In one embodiment, the upper edges 46, 48 of bag racks 42, 44 are located in parallel planes. In another embodiment, one or both of the upper edges 46, 48 are angled or tipped slightly toward the cashier location 50. Angling the upper edge 48 toward the cashier location facilitates cashier access to bags 22, thereby reducing muscle strain on the cashier.

In one embodiment, each bag rack 42, 44 has a pair of spaced elongated support rods 52. The support rods 52 of the lower bag racks 42 are attached to a first wall 54, while the upper bag racks 44 are attached to a second wall 56. More specifically, the first wall 54 is laterally spaced from the second wall 56 relative to the longitudinally extending processing path 20. The first wall 54 is positioned nearer to the cashier than the second wall 56. With the above in mind, the pair of support rods 52 are adapted to laterally extend from wall 54 or 56 to hold a plurality of shopping bags 22 between each pair of support rods 52. More specifically, in one example each of the bags 22 is held open between the pair of support rods 52. In one example, the bags 22 and the bag racks 42, 44 are bags or bag racks similar to those illustrated in U.S. Pat. No. 4,398,689 (Prader); U.S. Pat. No. 4,487,388 (Provan); U.S. Pat. No. 4,529,090 (Pilon); U.S. Pat. No. 4,744,200 (Benoit, Jr. et al.); U.S. Pat. No. 4,796,759 (Schisler); U.S. Pat. No. 4,821,985 (DeMatteis et al.); U.S. Pat. No. 5,183,158 (Boyd et al.); and RE 33,264 (Baxley et al.), which are incorporated herein by reference. A variety of other bags and bag racks can be used with the present check-out counter system 10.

The bagging station 18 additionally includes a lower support shelf 60 positioned below the lower bag racks 42 and an upper support shelf 62 positioned below the upper bag racks 44. The lower and upper support shelves 60 and 62, respectively, each include a top surface configured to support the bags 22 when the bags 22 hung from the bag racks 42 and 42 are loaded with merchandise. The support shelves 60, 62 also permit self-supporting bags, such as paper bags, to be positioned in the bag racks 42, 44 in an open configuration ready to receive merchandise.

In one embodiment, a deck area 70 is optionally located downstream of the bag racks 42 and 44. After the cashier finishes loading the merchandise into the bags 22, the loaded bags 22 are removed from the lower bag rack 42 and/or the upper bag rack 44 and placed on the deck area 70. The customer and/or the cashier then picks up these loaded bags 22 from the deck area 70 for transport away from the check-out counter system 10.

In the illustrated embodiment, the deck area 70 has a substantially flat top surface generally coplanar with the top surface of the upper support shelf 62, so that the loaded bags 22 can be slid to the deck area 70 from the upper support shelf 62. In another embodiment, the top surface of the deck area 70 is generally coplanar with the top surface of the lower support shelf 60, so that the loaded bags 22 can be directly slid downstream to the deck area 70 from the lower support shelf 60. Sliding the loaded bags 22 from the lower support shelf 60 or the upper support shelf 62 to the deck area 70 reduces the need for the cashier to lift and move heavy loaded bags 22.

In yet another embodiment, the top surface of the deck area 70 is coplanar with neither the top surface of the upper support shelf 62 nor with the top surface of the lower support shelf 60. For example, as illustrated in the rear view of FIG. 4, the upper edge 48 of the lower bag racks 42 is generally positioned coplanar with the upper support surfaces of each of the conveyor belt 24 and the user interface 16, and the upper edge 46 of each of the upper bag racks 44 is generally positioned above the upper support surfaces of the conveyor belt 24 and the user interface 16. In another embodiment, the upper edge 48 of the lower bag racks 42 is generally positioned below the support surfaces of the conveyor belt 24 and the user interface 16, while the upper edge 46 of the upper bag racks 44 is generally positioned above the support surfaces of the conveyor belt 24 and the user interface 16.

The lower bag racks 42 collectively extend between longitudinally spaced edges 72 and 74 and the upper bag racks 44 collectively extend between longitudinally spaced edges 76 and 78. In one embodiment, the edges 76 and 78 of the upper bag racks 44 are aligned with the edges 72 and 74 of the lower bag racks 42, respectively. In another embodiment, the edges 76 and 78 and the edges 72 and 74 are respectively offset from each other.

Figure 5:
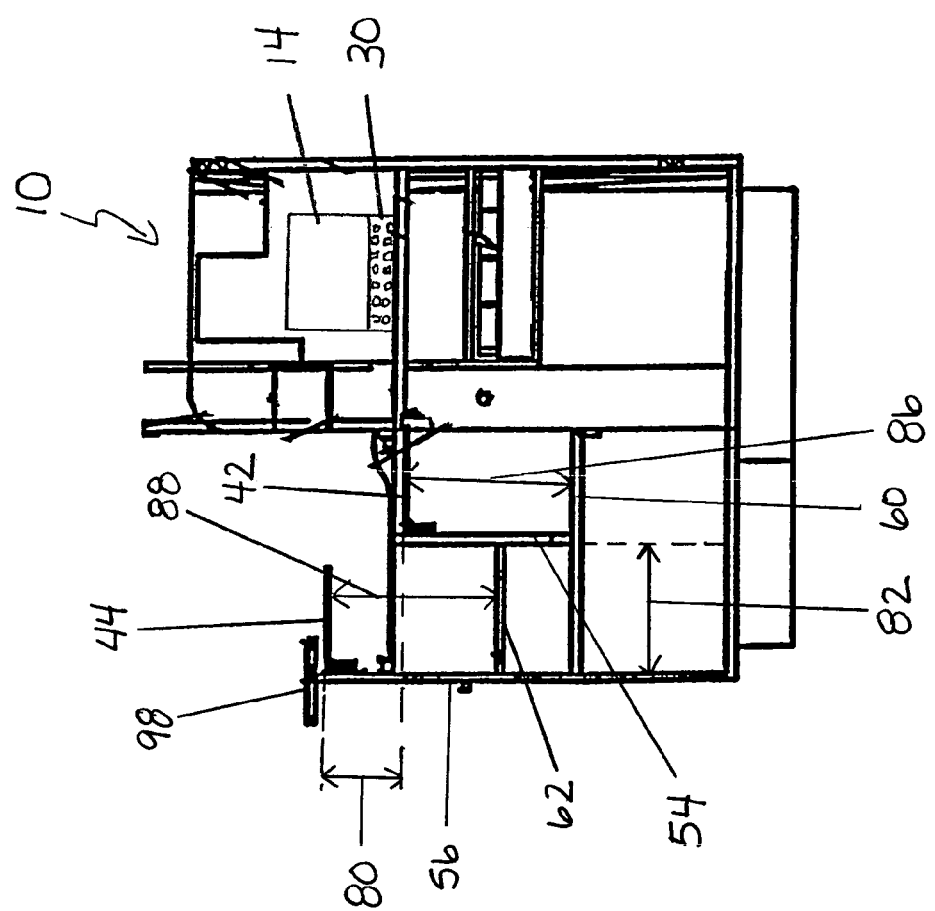
FIG. 5 is a cross-sectional view of the check-out counter system of FIG. 4 taken along line 5-5.

Referring to FIG. 5, a distance 80 is defined between the upper edges 46 of the upper bag racks 44 and the upper edges 48 of the lower bag racks 42. In one embodiment, the distance 80 is generally between about five inches to about twelve inches. Further, in one example, a distance 82 defined between the first wall 54 and the second wall 56 is generally between about eight inches to about fourteen inches.

A distance 84 (see FIG. 4) is defined between the pair of elongated rods 52 of each of the bag racks 42 and 44 and is uniform for each bag rack 42 and 44. In one embodiment, the distance 84 is about twelve inches. In another embodiment, the distance 84 defined between the pair of elongated rods 52 of each of the bag racks 42 and 44 may be different from each other, so that bags 22 with different sizes can be used with the differently sized bag racks 42 and 44.

A distance 86 is defined between the upper edges 46 of the lower bag racks 42 and the top surface of the lower support shelf 60. In one embodiment, the distance 86 is generally equal to a distance 88, which is defined between the upper edges 48 of the upper bag racks 44 and the top surface of the upper support shelf 62. Therefore, in this embodiment, the size of the bags 22 on the lower bag racks 42 and the size of the bags on the upper bag racks 44 are generally the same. In one example, the distances 86 and 88 are each generally about fifteen inches.

In another embodiment, the distance 86 is not equal to the distance 88, so that the size of the bags on the lower bag racks 42 and the size of the bags on the upper bag racks 44 are different. For example, the distance 88 can be longer than the distance 86, so that the top surface of the lower support shelf 60, the top surface of the upper support shelf 62, and the top surface of the deck area 70 (See FIGS. 1 and 2) are generally coplanar. In this embodiment, the loaded bags 22 can be slid to the deck area 70 from the lower support shelf 60 and the upper support shelf 62 by the cashier. Such arrangement reduces the need for the cashier to lift heavy loaded bags 22.

In one embodiment, the check-out counter system 10 further includes an additional large size bag rack 90 for holding large bags 92 and/or a cloth hanger hook 94 for holding cloth hangers. The large size bag rack 90 and the cloth hanger hook 94 are located laterally adjacent to the deck area 70. The large bag rack 90 is similar to the bag racks 42, 44. Similarly, large bags 92 are similar to bags 22 only sized larger.

Figure 3:
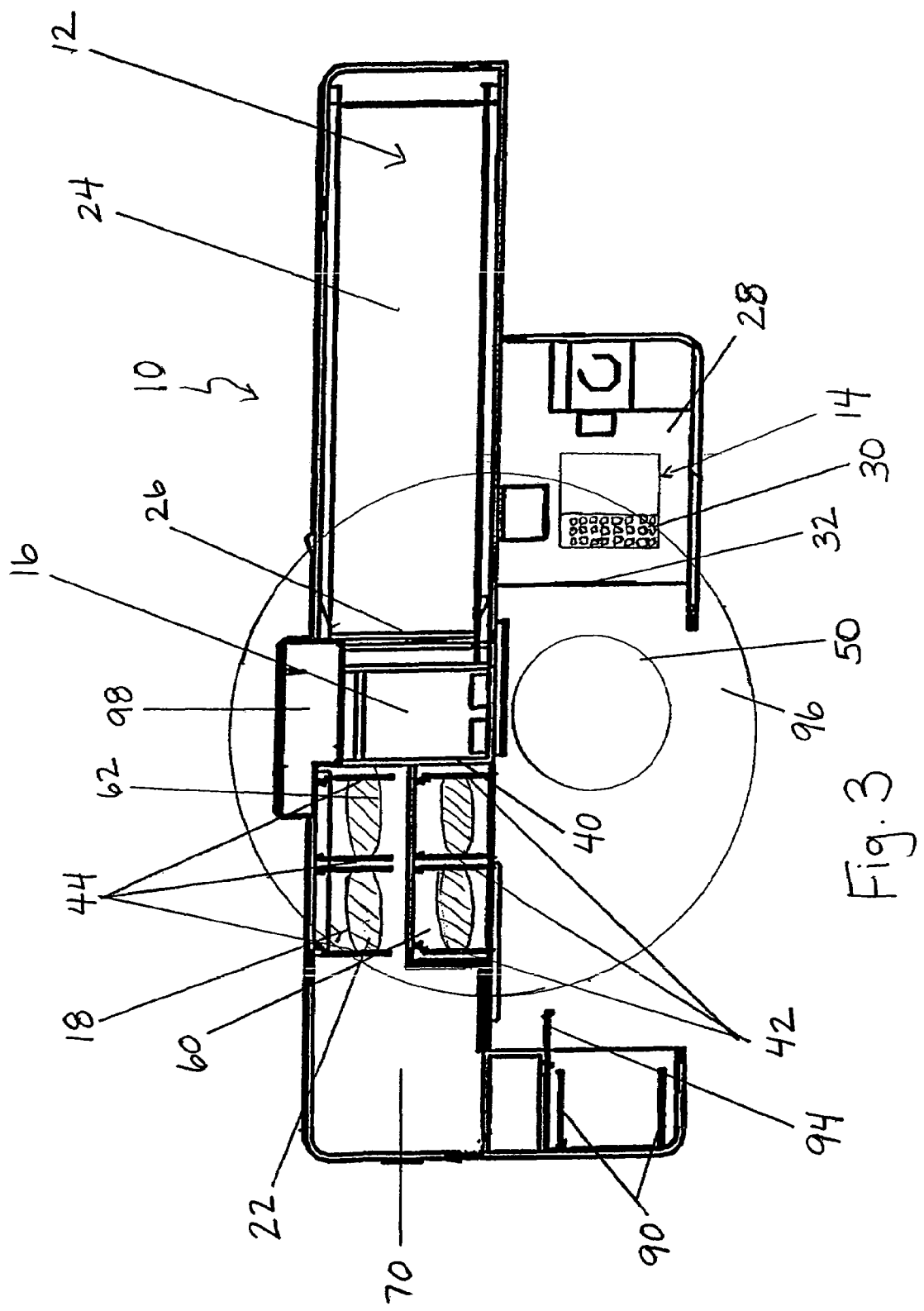
FIG. 3 is a top view of the check-out counter system of FIG. 1.
Figure 4:
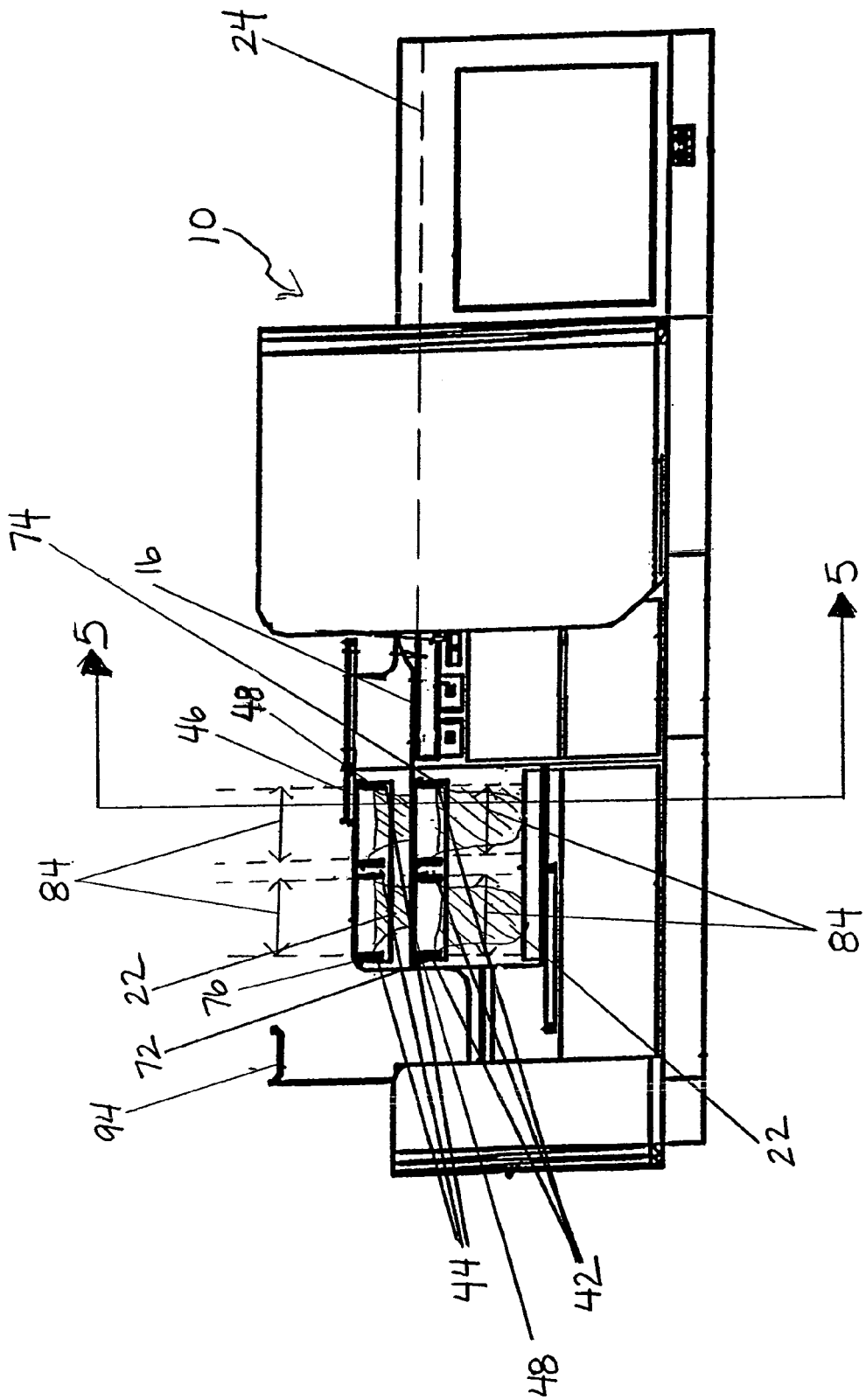
FIG. 4 is a rear view of the check-out counter system of FIG. 1.

As illustrated in FIG. 3, the check-out counter system 10 defines an operating area 96 generally surrounding the cashier location 50 at which the cashier is positioned. The operating area 96 is a region from which a cashier can access merchandise from the unloading area 12, interact with the user interface 16 and the point-of-sale terminal 14, and load merchandise into bags 22 at the bagging station 18. In one embodiment, the cashier accesses operating area 96 without frequently and substantially stretching, straining, or leaning his or her body. More particularly, the cashier can stand or sit in the cashier location 50 and reach the entire operating area 96 without moving his or her feet or the chair.

In one embodiment operating area 96 is generally circular with a nominal diameter of about 68 inches. However, diameter and shape of the operating area 96 will increase or decrease depending upon the size and general mobility of the particular cashier. In the illustrated embodiment, the operating area 96 encompasses the terminal end 26 of the conveyor belt 24, the user interface 16, the point-of-sale terminal 14, and the bagging station 18.

In some embodiments where the user interface 16 is a radio frequency scanner that detects RFIDs on the merchandise, the user interface 16 is located outside the operating area 96, but still is operative within in the operating area 96. In particular, the cashier can move merchandise past a particular location in the operating area 96 that permits the user interface 16 to identify that merchandise, even though the user interface 16 is located outside the operating area 96. Whether a particular user interface 16 is operative in the operating area 96 depends upon the effective range of the user interface 16. As used herein, "operative" refers the capability to identify merchandise located in an operating area, irrespective of where the hardware performing the identification function is located.

In one embodiment, the operating area 96 also encompasses a portion of the deck area 70, large size bag rack 90, and/or cloth hanger hook 94. The operating area 96 optionally includes any of a variety of additional components typically found in a grocery or retail store environment, such as for example a customer price display, a credit/debit card reader, a check writing stand 98, a scale for weighing merchandise, etc. In an alternate embodiment where the point-of-sale terminal 14 is a general or special purpose computer, the point-of-sale terminal 14 is located outside of the operating area 96.

During one embodiment of a check-out process, the cashier stands or sits in the cashier location 50, while the customer places merchandise on the conveyor belt 24. The conveyor belt 24 moves the merchandise to the terminal end 26 where the cashier takes the merchandise from the conveyor belt 24. The cashier records the identity of each item of the merchandise using the user interface 16. In one embodiment, after the merchandise is successfully identified or scanned, the cashier loads the merchandise directly into one of the bags 22 stored in the bagging station 18. In an embodiment where the user interface 16 is a radio frequency transponder, the cashier simply moves the merchandise from the conveyor belt 24 directly into the bags 22 of bagging station 18.

The terraced bagging station 18 allows the cashier to load incompatible items into different bags 22 held on the lower and upper bag racks 42 and 44. Since multiple bags 22 are simultaneously accessible to the cashier, the sorting process can occur immediately after each item of merchandise is scanned. Examples of such items are frozen foods and other food items, detergents and chemicals such as bleach or bathroom products that are generally separated from food or other items by a careful cashier, or breakable items such as eggs and light bulbs that are generally separated from heavier objects to decrease inadvertent breaking of the items.

The loaded bags 22 are removed from the bag racks 42 and 44 and placed on the deck area 70. The deck area 70 is customer accessible allowing the customer to pick up the loaded bags 22 for transfer of the loaded bags 22 away from check-out counter system 10. In one embodiment, the customer also or alternatively has access to the bags 22 held by the upper bag rack 44 and, therefore, can help load merchandise into bags 22 and/or directly take the loaded bags 22 from the upper bag rack 44. In other embodiments, the merchandise is also loaded into the large bag 92 and positioned for subsequent customer access.

Figure 6:
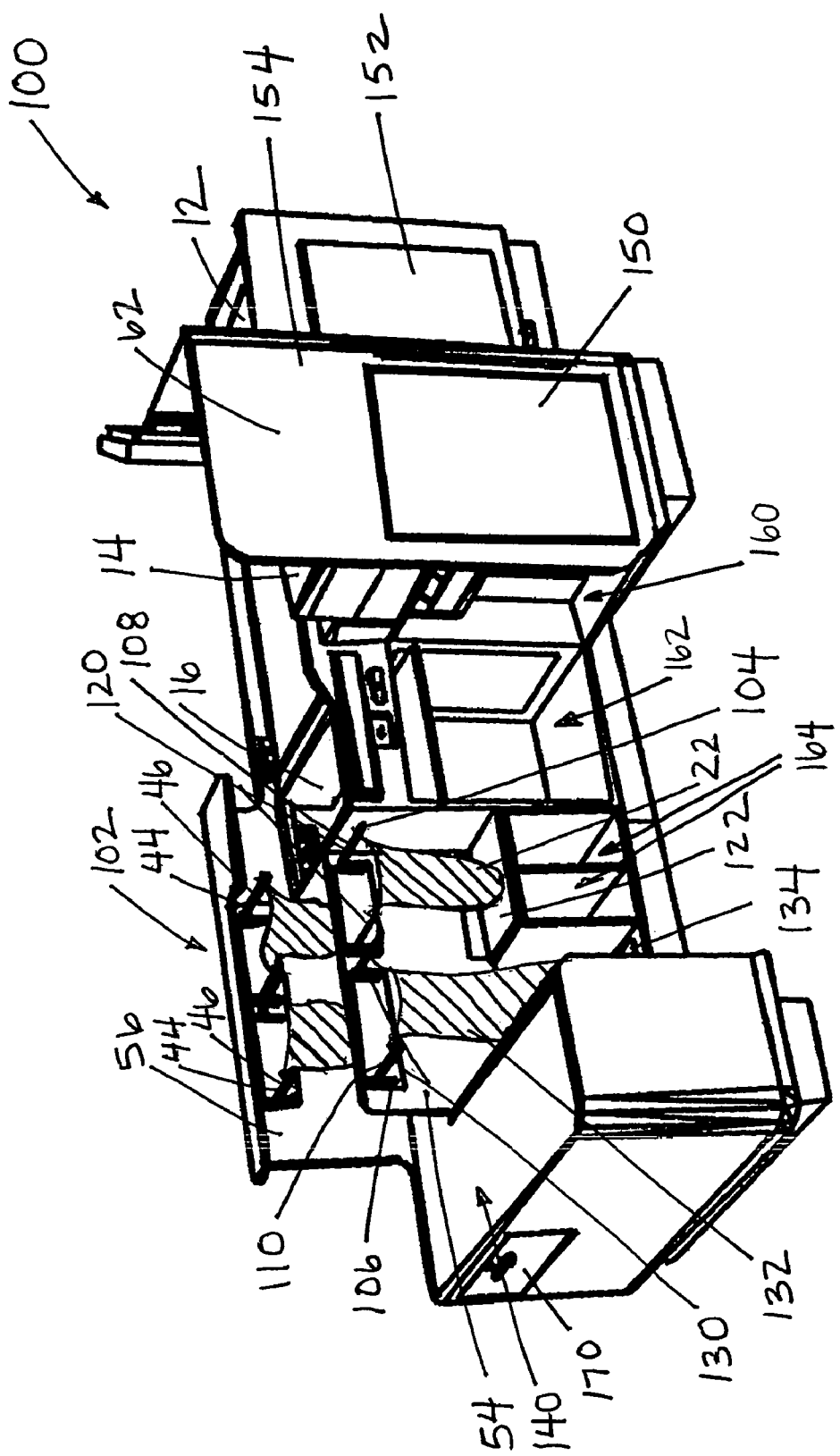
FIG. 6 is a rear isometric view of one embodiment of a check-out counter system, according to the present invention.
Figure 7:
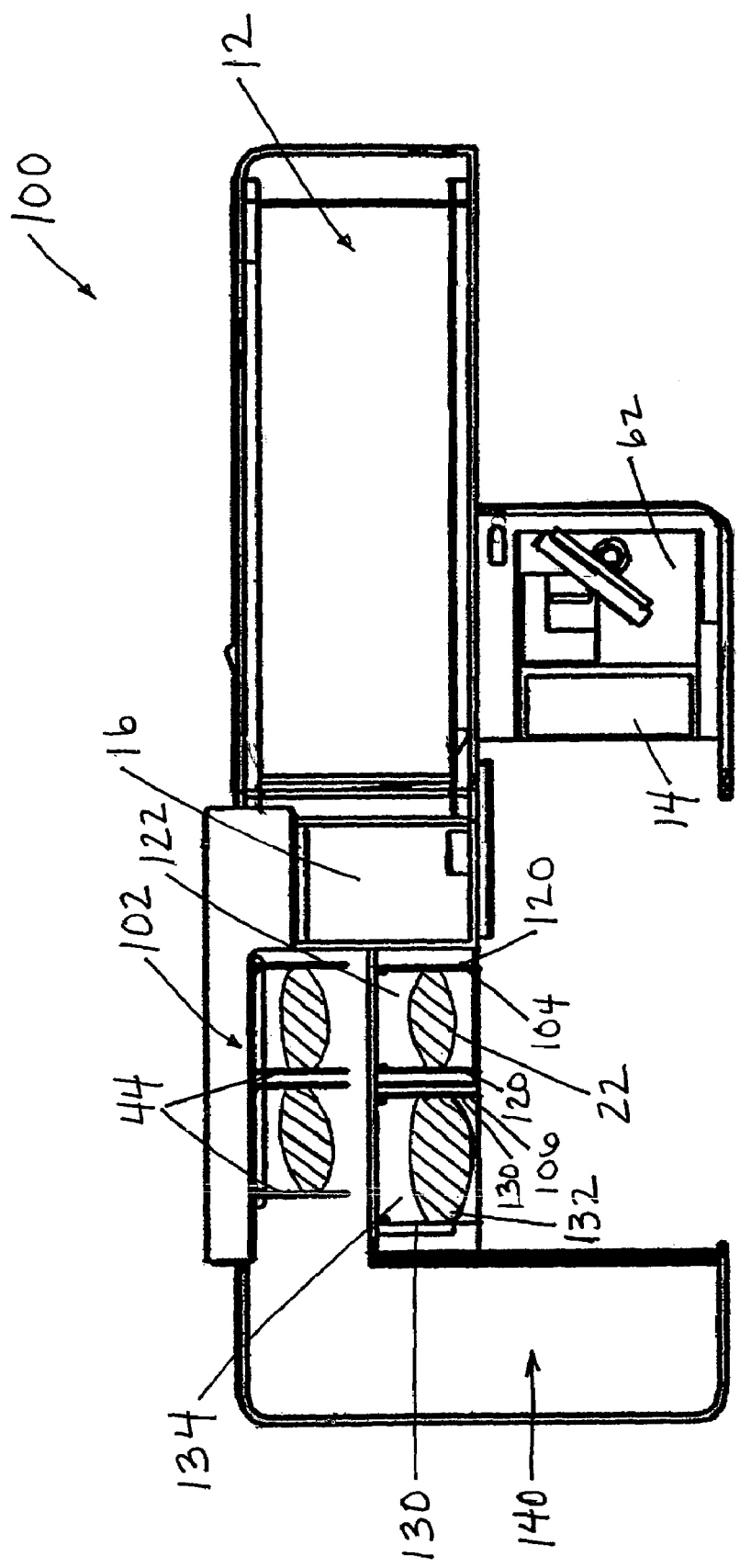
FIG. 7 is a top view of the check-out counter system of FIG. 6.
Figure 8:
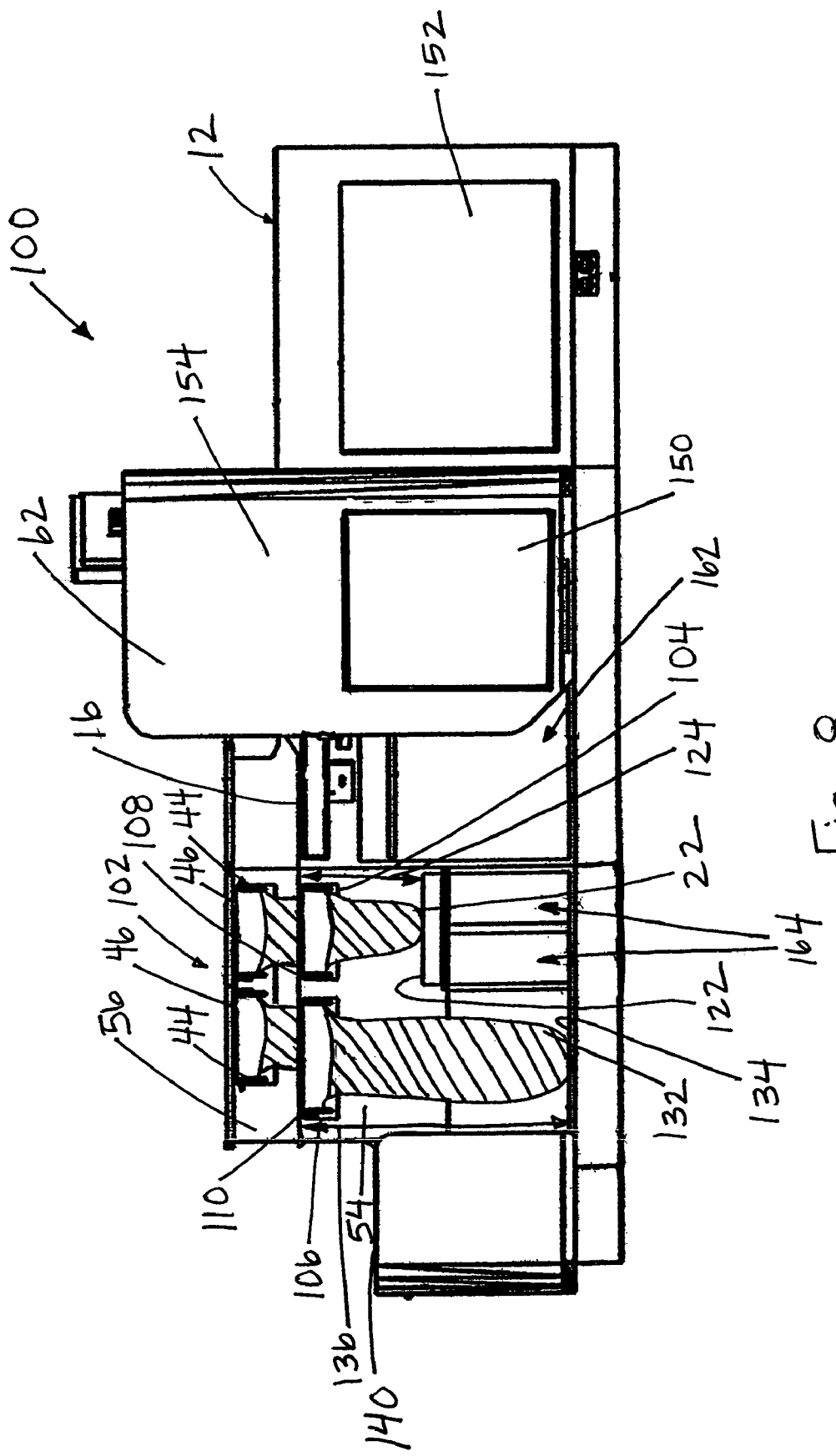
FIG. 8 is a rear view of the check-out counter system of FIG. 6.

FIGS. 6-8 illustrate another embodiment of a check-out counter system at 100. The check-out counter system 100 is generally similar to check-out counter system 10 except for those differences specifically described herein. With this in mind, the check-out counter system 100 includes the unload area 12, the user interface 16, the point-of-sale terminal 14, and a bagging station 102. Bagging station 102 includes upper bag racks 44, a first lower bag rack 104, and a second lower bag rack 106. The first and second lower bag racks 104 and 106 are collectively arranged in a terraced relationship with respect to the upper bag rack 44, such that the upper edge 46 of each of the upper bag racks 44 is positioned above upper edges 108 and 110 of the first and second lower bag racks 104 and 106, respectively.

First lower bag rack 104 is similar to the lower bag rack 42 described above and includes a pair of spaced elongated support rods 120 extending from the first wall 54. The plurality of bags 22 are hung between the pair of support rods 120. A first lower support shelf 122 is positioned below the first lower bag rack 104. The first lower support shelf 122 includes a top surface to support the bag 22 hung from the first lower support shelf 122 when the bag 22 is loaded with merchandise. As illustrated in FIG. 8, a distance 124 is defined between first lower bag rack 104 and first lower support shelf 122. The support shelf 122 also permits self-supporting bags (not illustrated), such as paper bags, to be positioned in an open configuration ready to receive merchandise.

Second lower bag rack 106 includes a pair of spaced elongated support rods 130 extending from the first wall 54. In one embodiment, the pair of support rods 130 are hung coplanar to the pair of support rods 120 of first lower bag rack 102. A plurality of large bags 132, which, in one embodiment, are similar to the large bags 92 described above, are hung between the pair of support rods 130. Accordingly, a second lower support shelf 134 is positioned below the second lower bag rack 106.

The second lower support shelf 134 includes a top surface to support the bag 132 when the bag 132 is loaded with merchandise. As illustrated in FIG. 8, a distance 136 is defined between second lower bag rack 106 and second lower support shelf 134. In one embodiment, in order for second lower bag rack 106 to accommodate bags 132, which are relatively larger than the bags 22, second lower support shelf 134 is positioned below first lower support shelf 122. Otherwise stated, the distance 136 is greater than the distance 124.

In one embodiment, the check-out counter system 100 includes a deck area 140 located downstream of the bag racks 44, 104, and 106. Similar to the deck area 70, the deck area 140 has a substantially flat top surface generally coplanar with the top surface of the upper support shelf 62, thereby allowing the loaded bags 22 to be slid to the deck area 70 from the upper support shelf 62. In one example, the deck area 140 also extends laterally backwards, thereby increasing the size of the deck area 140 as compared to deck area 70, described above. The larger deck area 140 is able to support more of the loaded bags 22 and/or 132 prior to transport of the loaded bags 22 and/or 132 away from check-out counter system 100 as compared to the deck area 70.

In one embodiment, check-out counter system 100 includes one or more additional attributes, such as a security mirror 150 and/or a soda machine receptacle 152. In one example, the security mirror 150 is secured to an outer wall 154 of the stand 62. Similarly, soda machine receptacle 152 is secured below unload area 12.

Additionally, storage locations 160, 162, and 164 are defined below the point-of-sale terminal 14, the user interface 16, and the first lower support shelf 122, respectively. In one embodiment, storage locations 160, 162, and 164 collectively store at least one of a trash bin, tissue paper, cleaning supplies, additional bags, hangers, etc. In particular, in one example, the storage location 160 houses a trash bin, the storage location 162 houses tissue paper, and the storage location 164 houses cleaning supplies and additional bags. Additional storage is optionally included below the deck area 70. Moreover, in one embodiment, a locking till drawer 170 is included below deck area 140 opposite the bagging station 18.

The check-out counter systems in accordance with embodiments of the present invention provides a number of important advantages. The terraced bagging station permits the cashier to load incompatible items into different bags as stated above. Multiple bags are simultaneously available to the cashier to sort the merchandise. In addition, the check-out process can be generally completed by a cashier within the operating area reducing the cashier need to substantially stretch, strain, or lean his or her body. The cashier can also stand or sit in a chair in the cashier location without frequently and substantially moving his or her feet or the chair. Even if the cashier infrequently moves his or her feet, the footprint of movement is relatively small. The cashier does not have to walk back and forth from a checking position to a bagging position.

Further, the arrangement of the bag racks in a terraced manner requires less length of the check-out counter system than bag racks arranged in a side-by-side manner. As a result, less valuable store square footage is required for the check-out counter system. Simultaneously, the check-out counter systems are shaped and sized to allow additional individuals, such as other workers or the customer, to assist the cashier in the bagging process if so desired.

All of the patents and patent applications disclosed herein are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details described herein as modifications and variations thereof may be made without departing from the spirit or scope of the invention. For example, the various components of the check-out counter system 10 can readily be interchanged with the various components of the check-out counter system 100. Moreover, the various bag racks 42, 44, 90, 104, and 106 are also interchangeable. Thus, the scope of the present invention should not be limited to the structures described in this application, but only by the structures described by the language of the claims and the equivalents of those structures.

What is claimed is:

1. A bagging station within a check-out counter system and for use by a cashier positioned at a cashier location within the check-out counter system, the bagging station comprising:

a lower bag rack configured to hold at least one bag for loading with merchandise, the lower bag rack defining a first upper edge;

an upper bag rack configured to hold at least one bag for loading with merchandise, wherein the upper bag rack is positioned behind the lower bag rack relative to the cashier location during use, and wherein the upper bag rack defines a second upper edge, the first upper edge and the second upper edge being arranged in a terraced configuration; and an upper support shelf positioned below the upper bag rack, wherein the upper support shelf is configured to provide additional support to the at least one bag held by the upper bag rack when the at least one bag is loaded with merchandise, and wherein the first upper edge extends above the upper support shelf.

2. The bagging station of claim 1, further comprising:

a lower support shelf positioned below the lower bag rack, wherein the lower support shelf is configured to provide additional support to the at least one bag held by the lower bag rack when the at least one bag is loaded with merchandise.

3. The bagging station of claim 2, wherein a first distance is defined between the lower support shelf and the first upper edge of the lower bag rack, and a second distance is defined between the upper support shelf and the second upper edge of the upper bag rack, and further wherein the first distance is equal to the second distance.

4. The bagging station of claim 2, wherein a first distance is defined between the lower support shelf and the first upper edge of the lower bag rack, and a second distance is defined between the upper support shelf and the second upper edge of the upper bag rack, and further wherein the first distance is greater than the second distance.

5. The bagging station of claim 1, wherein the upper bag rack includes a pair of laterally extending support rods, and further wherein the upper bag rack holds the at least one bag by hanging the at least one bag between the pair of laterally extending support rods.

6. The bagging station of claim 1, further comprising:

a plurality of first bags held by the lower bag rack;

a plurality of second bags held by the upper bag rack;

wherein each of the plurality of second bags is generally larger than each of the plurality of first bags.

7. The bagging station of claim 1, wherein the first upper edge and the second upper edge are angled toward the cashier location.

8. The bagging station of claim 1, wherein the lower bag rack defines a first edge and a second edge longitudinally spaced from the first edge, and the upper bag rack defines a third edge and a fourth edge longitudinally spaced from the third edge, and further wherein the first edge is longitudinally aligned with the third edge, and the second edge is longitudinally aligned with the fourth edge.

9. A check-out counter system for processing merchandise, comprising:
a scanner configured to collect merchandise information from the merchandise;
a bagging station positioned adjacent to the scanner, the bagging station including:
a first bag rack configured to support a plurality of first bags for loading with a first portion of the merchandise,
a first support shelf positioned a first distance below the first bag rack and configured to support each of the plurality of first bags when each of the plurality of first bags is loaded with the first portion of the merchandise,
a second bag rack adjacent the first bag rack and configured to support a plurality of second bags for loading with a second portion of the merchandise, and
a second support shelf positioned a second distance below the second bag rack and configured to support each of the plurality of second bags when each of the plurality of second bags is loaded with a second portion of the merchandise,
wherein the second distance is greater than the first distance; and
a deck area for supporting at least one of the plurality of first bags and the plurality of second bags after at least one of the plurality of first bags and the plurality of second bags has been loaded with a respective portion of the merchandise, the deck area being adjacent the bagging station opposite the scanner.

10. The check-out counter system of claim 9, wherein the bagging station additionally includes:
a third bag rack configured to support a plurality of third bags, and
a third support shelf positioned a third distance below the third bag rack and configured to support each of the plurality of third bags when each of the plurality of third bags is loaded with a third portion of the merchandise.

11. The check-out counter system of claim 10, wherein the plurality of third bags are sized similarly to the plurality of first bags.

12. The check-out counter system of claim 11, wherein the third distance is equal to the first distance.

13. The check-out counter system of claim 10, wherein the third bag rack is positioned behind the first bag rack relative to a cashier working at the check-out counter system.

14. The check-out counter system of claim 9, wherein the scanner defines a top surface, and the first bag rack defines an upper edge, and further wherein the top surface of the scanner and the upper edge of the first bag rank are generally coplanar.

15. The check-out counter system of claim 9, wherein the deck area defines a top surface, and the second support shelf defines a top surface, and further wherein the top surface of the deck area and the top surface of the second support shelf are generally coplanar.

16. The check-out counter system of claim 9, further comprising:
a cashier location at which a cashier is stationed while utilizing the check-out counter system, wherein a operating area is defined as an area accessible by the cashier when the cashier is positioned at the cashier location, and further wherein at least a portion of the scanner and a portion of the bagging station are each positioned within the operating area.

17. The check-out counter system of claim 9, further comprising:
a hanger hook spaced from the first bag rack and the second bag rack.

18. A check-out counter comprising:
means for hanging and supporting a plurality of bags while one of the plurality of bags is loaded with merchandise;
means for holding the one of the plurality of bags after the one of the plurality of bags is loaded with merchandise, wherein the means for hanging and supporting is separated from the means for holding; and
means for transferring the one of the plurality of bags loaded with merchandise from the means for hanging and supporting to the means for holding, wherein the means for transferring is characterized by an absence of lifting the one of the plurality of bags from the means for hanging and supporting.

19. The check-out counter of claim 18, wherein the plurality of bags is a first plurality of bags, the check-out counter further comprising:
means for hanging and supporting a second plurality of bags positioned in a terraced arrangement with the first plurality of bags;
wherein the first and second plurality of bags are accessible from a cashier location adjacent the check-out counter.

20. The check-out counter of claim 19, further including:
means for reading information about the merchandise;
means for sliding the merchandise between the means for reading and the means for hanging and supporting the second plurality of bags.

21. The check-out counter of claim 18, wherein the means for transferring includes means for sliding the one of the plurality of bags loaded with merchandise between the means for banging and supporting to the means for holding.

22. A method of processing merchandise in a check-out counter system, the method comprising:
providing a first bag holder adjacent a merchandise reader;
reading information from merchandise with the merchandise reader;
placing a first portion of the merchandise in a first bag held open by the first bag holder;
placing a second portion of the merchandise in a second bag held open by a second bag holder positioned in front of and below the first bag holder relative to a cashier location within the check-out counter system; and
transferring the first bag containing the first portion of the merchandise from the first bag holder to a deck area for short term storage prior to transporting the first bag away from the check-out counter system, the deck area being adjacent the first and second bag holders opposite the merchandise reader.

23. The method of claim 22, wherein placing a first portion of the merchandise in a first bag includes sliding the first portion of the merchandise over the merchandise reader and into the first bag.

24. The method of claim 22, wherein placing the first portion and placing the second portion includes sorting the merchandise into a first portion and a second portion based upon at least one of fragility, toxicity, size, and probable use of the merchandise.

25. The method of claim 22, wherein a first support shelf is positioned below the first bag holder, the method further comprising:

supporting the first bag with the first support shelf when the first portion of merchandise is placed within the first bag.

26. The method of claim 25, wherein transferring a first bag from the first bag holder includes sliding the first bag from the first support shelf to the deck area.

* * * * *